Oct. 7, 1941.  T. MADSEN  2,258,576
CIRCUMFERENTIALLY TIGHTENING PACKING RING
Filed Jan. 18, 1938  3 Sheets-Sheet 1
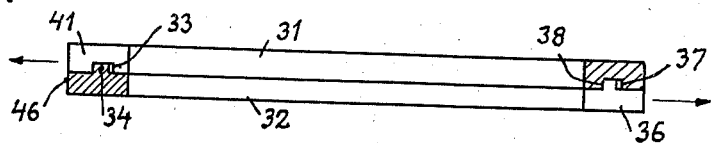
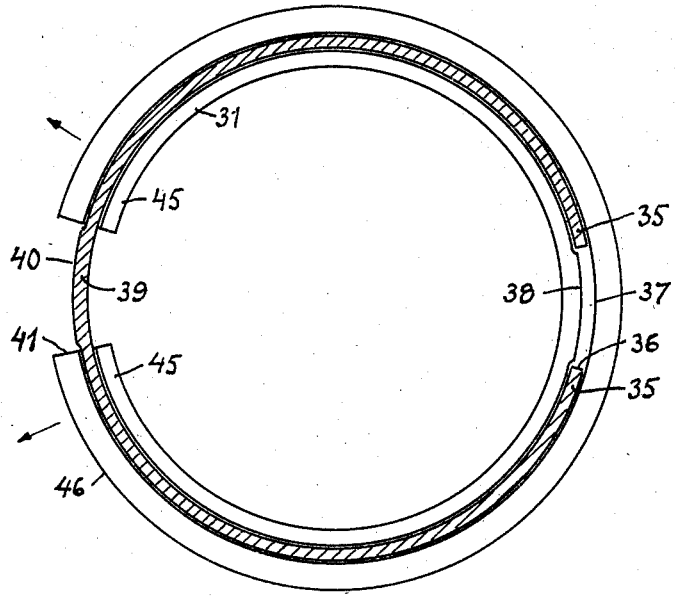
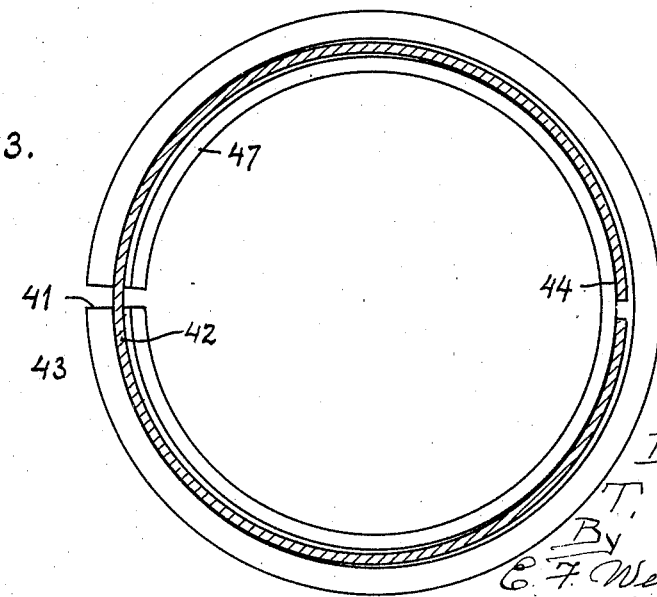
Inventor
T. Madsen
By E. F. Wenderoth
Atty Oct. 7, 1941.                T. MADSEN                    2,258,576
                CIRCUMFERENTIALLY TIGHTENING PACKING RING
                    Filed Jan. 18, 1938          3 Sheets-Sheet 2

Inventor
T. Madsen
By
E. F. Wenderoth
Atty

Oct. 7, 1941.                T. MADSEN                2,258,576
            CIRCUMFERENTIALLY TIGHTENING PACKING RING
                        Filed Jan. 18, 1938          3 Sheets-Sheet 3
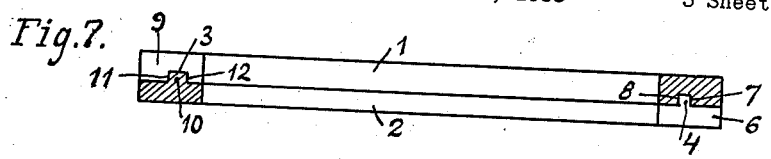
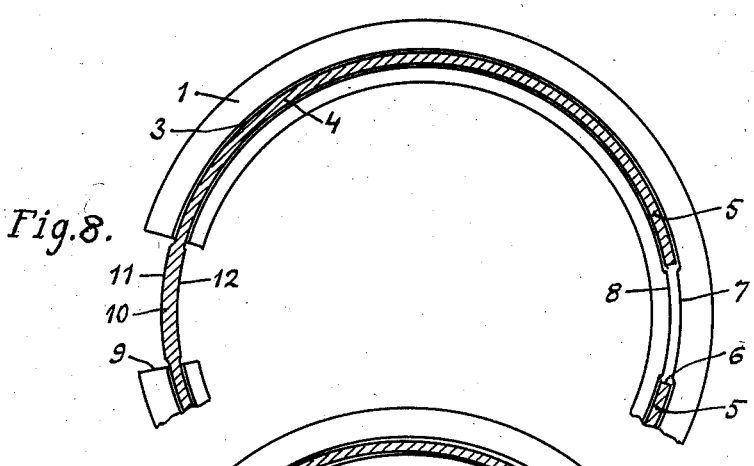
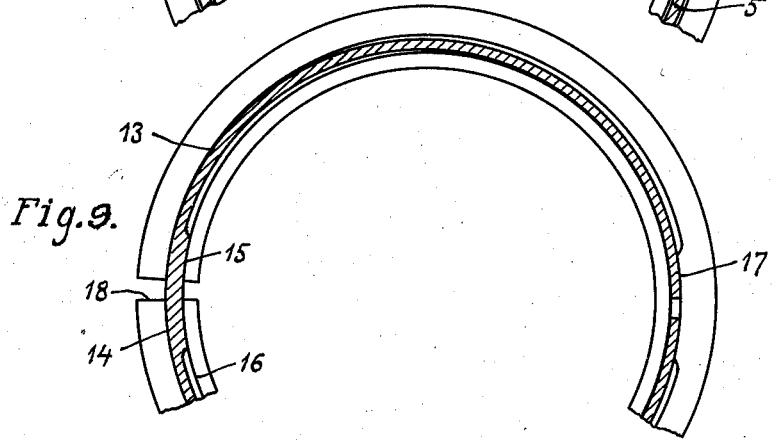
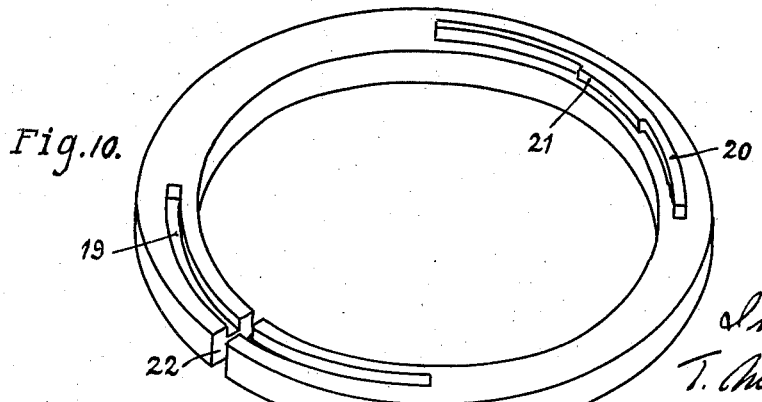

Patented Oct. 7, 1941

2,258,576

UNITED STATES PATENT OFFICE 2,258,576

CIRCUMFERENTIALLY TIGHTENING PACKING RING

Tage Madsen, Goteborg, Sweden

Application January 18, 1938, Serial No. 185,614
In Sweden November 27, 1937

5 Claims. (Cl. 309—29)

My invention relates to improvements in packing rings for pistons, piston rods and rotating shafts and is more particularly related to composite packing rings which comprise two split rings axially superimposed, one upon the other, and interengaged by means of flanges and grooves on the opposing surfaces of the component rings.

The present invention provides a form of construction of composite packing rings in which the components have axially projecting annular flanges coacting with wider grooves and is such that the ends of at least one of the component rings cannot move radially upon the coacting or interengaging ring in a direction away from the packing face. The object is to obtain a ring, the ends of which can better resist high pressures and high speeds such as are used nowadays in internal combustion engines, steam engines and other machines.

The invention will now be more particularly described with reference to the accompanying drawings showing sections and parts of packing rings of different forms and how they should be designed when they have a tendency to spring outwards when used on a piston in a cylinder and when they have a tendency to spring inwards when used around a piston rod in a stuffing box or a rotating shaft.

Fig. 1 shows an axial section through the composite piston rings shown in Figs. 2 and 3 through their joints or splits, and Figs. 2 and 3 show parts of U-rings, viz. grooved rings, from below with the cut off flange of the coacting T-ring left in the groove.

Fig. 2 shows a modification in which the flange is concentric to the groove and with the ring expanded so as to allow pulling it over the piston.

Fig. 3 shows another modification in which the flange is eccentric to the groove and the ring nearly closed as if positioned in its piston ring groove within a cylinder.

Figure 4:
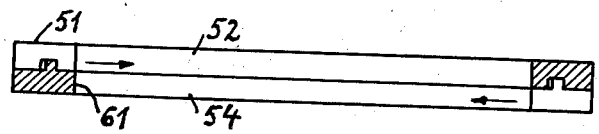
Figure 5:
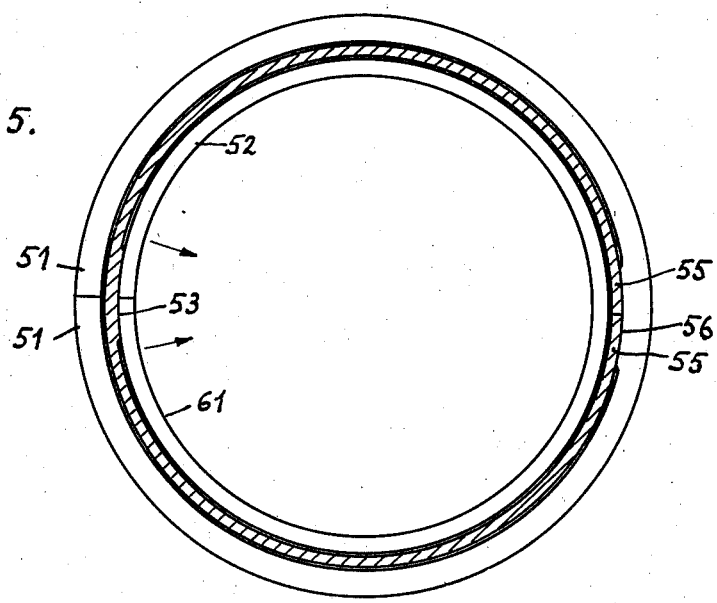
Figure 6:
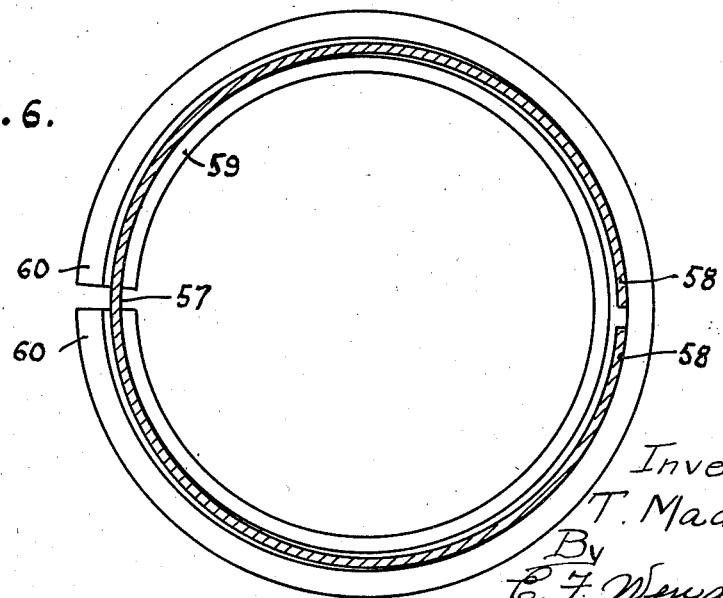

Fig. 4 shows an axial section through the composite piston rod rings shown in Figs. 5 and 6 through their splits, and Figs. 5 and 6 show rings as applied to piston rods similar to those shown in Figs. 2 and 3 respectively.

Fig. 5 shows the ring before it has been applied around the rod and Fig. 6 as in operative position.

Fig. 7 shows an axial section through the composite rings of Figs. 8 and 9.

Figs. 8 and 9 show rings similar to the rings shown in Figs. 2 and 3 but with the walls of the grooves and flanges thickened on both sides.

Fig. 10 shows a perspective view of one component ring of a modification provided with a groove on one half of its circumference and a flange on the other half and in this modification the two components are exactly alike.

Since the rings in Figs. 1–3 are piston rings they have a tendency to expand, as indicated with arrows in Figs. 1 and 2, and the outer circumference is the packing face. And since the rings in Figs. 4–6 are piston rod packing rings they have a tendency to contract, as indicated with arrows in Figs. 4 and 5, and the inner circumference is the packing face.

The rings shown in Figs. 7, 8 and 9 can be used either as piston rings or as piston rod packing rings, only they are made to expand or contract respectively.

In Figs. 1 and 2 of the U-ring 31 with groove 33 is shown disposed on top of the T-ring 32 and its flange 34. The flange ends 35 at the split 36 are intended to rest against the inner wall 38 of the groove and leave a small space inside the outer wall 37 when the ring is in action in the cylinder. And the "back" 39 of the flange is thickened on the outer side 40 to rest against the outer wall of the groove at the split 41 of the U-ring 31. The side 40 prevents the ends 45 of the U-ring 31 from being blown inwards away from the packing face 46 or cylinder-surface by the action of the gas pressure in the cylinder.

When the piston packing ring is working in a combustion engine cylinder and the U-ring is placed on top of the T-ring, as shown in Fig. 1, said U-ring is exposed to a heavy pressure from above. Such a pressure can become so high that the gas is pressed between the cylinder wall and the packing rings, especially at the uppermost ring on the piston where the pressure is highest. Such a pressure on the outside of the U-ring at its ends can, however, not force said ends inwardly in the described case, because the flange will prevent this at the side 40. This is the principal idea of the present invention and is applied to all the packing rings in question here described.

The eccentric flange 42 in Fig. 3 lies at the split 41 of the U-ring 47 with its outer periphery up against the outer wall 43 of the groove of the U-ring in order to prevent the ends of the U-ring from being blown inwards. At the back 44 the groove prevents the flange and thereby the ends of the T-ring from being forced inwardly by the pressure.

In the piston rod packing ring of Fig. 5 the ends 51 of the U-ring 52 will be prevented from being blown outwardly away from the packing face 61 by the back 53 of the flange of the T-ring 54 because the concentric flange here has been thickened. In the same manner the ends of the T-ring will be prevented from being blown outwardly away from the packing face by means of the flange ends 55 resting against a thickened part 56 of the outer wall of the groove.

In Fig. 6 the eccentric flange 57 of the T-ring rests with its ends 58 against the outer wall of the groove of the U-ring 59 and the ends 60 of the U-ring rest against the flange at 57, in both cases in order to prevent the ends of the respective component rings from being blown away from the packing force.

Figs. 7 and 8 show a U-ring 1 with groove 2 and a T-ring 2 with flange 4. The flange ends 5 at the split 6 are intended to fit into the reduced width of the groove between the outer wall 7 and the inner wall 8 of said reduction. And the flange 10 at the split 9 of the U-ring 1 is thickened on both the outer side 11 and the inner side 12 to fit the groove. This embodiment may be used in cases where it is preferable to prevent the ends of a piston ring from protruding into the ports of the cylinder. The principal feature is in all cases, that the ends of respective rings shall be prevented from being blown away from the packing face.

As seen from Fig. 8, the flange 4 is quite free to move in the groove, when the packing ring is expanded as shown. The length of the thickened part 11 of the flange should preferably be smaller than the distance between the ends 9 of the U-ring when fully opened, as shown. Also the length of the wall 8 of the groove should preferably not be longer than the distance between the ends 5 of the T-ring when fully opened. If so, that would make it easier to mount a piston ring, in which case the T-ring is first applied over the piston just above the proper piston groove and then the U-ring is threaded over the piston and fitted to the T-ring. Such fitting is easier when the flange 4 has a clearance space along its entire length in the groove 3. When the collected ring then is moved further down opposite its piston groove, it is allowed to spring into this groove whereby the thickened and contracted parts come in contact with the coacting parts of the opposite component. The same will, of course, occur with an eccentric ring as that in Fig. 9. Since the rings when expanded to the degree shown in Fig. 8 do not maintain their circular form and neither the T-flange nor the U-groove does, there must be a space between the flange and the groove sufficiently large to allow a free movement between the flange and groove in order not to render the insertion or the exchange of piston rings too difficult.

Fig. 10 is a perspective view of one of the components in a packing ring, the components of which are exactly alike and are provided with a groove 19 on one half and a flange 20 on the other half of each component. In the form shown the groove and the flange occupy each only a quarter of the circumference. The flange is thickened at 21 in order to fill the groove in the opposite ring and prevent the ends of that ring from moving radially. Also in this case, the flange 20 can be made concentric or eccentric to the coacting groove and can be thickened or not, exactly as described in the other cases. The principal feature is that the ring ends of at least that component which takes the initial combustion or steam pressure are prevented from being forced away from the packing face.

I claim:

1. In a packing ring comprising two split rings axially superimposed, one upon the other, one of said rings being provided with an annular flange and the other ring having an annular groove of greater width than said flange in which said flange engages, one vertical side of said groove for a distance from the ends of the grooved component ring radially abutting that side of the flange which is nearest to the packing face of the packing ring.

2. In a packing ring comprising two split rings axially superimposed, one upon the other, one of said rings being provided with an annular flange and the other ring having an annular groove of greater width than said flange in which said flange engages, one vertical side of said groove for a distance from the ends of the grooved component ring radially abutting that side of the flange which is nearest to the packing face of the packing ring, and one vertical side of the flange for a distance from the ends of the flanged component ring radially abutting that side of the groove which is nearest to the packing face of the packing ring.

3. In a packing ring comprising two split rings axially superimposed, one upon the other, one of said rings being provided with an annular flange and the other ring having an annular groove of greater width than said flange in which said flange engages, the vertical sides of the groove for a distance from the ends of the grooved component ring radially abutting both sides of the flange.

4. In a packing ring comprising two split rings axially superimposed, one upon the other, one of said rings being provided with an annular flange and the other ring having an annular groove of greater width than said flange in which said flange engages, the vertical sides of the groove for a distance from the ends of the grooved component ring radially abutting both sides of the flange, and the vertical sides of the flange for a distance from the ends of the flanged component ring radially abutting both sides of the groove.

5. In a packing ring comprising two split rings axially superimposed, one upon the other, one of said rings being provided with an annular flange and the other ring having an annular groove of greater width than said flange in which said flange engages, and said flange being eccentric to said groove, one vertical side of said groove for a distance from the ends of the grooved component ring radially abutting that side of the flange which is nearest to the packing face of the packing ring, and one vertical side of the flange for a distance from the ends of the flanged component ring radially abutting that side of the groove which is nearest to the packing face of the packing ring.

TAGE MADSEN.